United States Patent
Arazi et al.

(10) Patent No.: US 9,485,636 B2
(45) Date of Patent: Nov. 1, 2016

(54) METHOD AND SYSTEM FOR OFF-NET MESSAGE COMMUNICATIONS

(71) Applicant: VONAGE NETWORK LLC, Holmdel, NJ (US)

(72) Inventors: Chen Arazi, Morganville, NJ (US); Nirav J. Kadakia, Morganville, NJ (US); Nehar Arora, Old Bridge, NJ (US)

(73) Assignee: Vonage America Inc., Holmdel, NJ (US)

( * ) Notice: Subject to any disclaimer, the term of this patent is extended or adjusted under 35 U.S.C. 154(b) by 0 days.

(21) Appl. No.: 14/252,956

(22) Filed: Apr. 15, 2014

(65) Prior Publication Data

US 2015/0172884 A1    Jun. 18, 2015

Related U.S. Application Data

(60) Provisional application No. 61/915,489, filed on Dec. 12, 2013.

(51) Int. Cl.

| | |
|---|---|
| *H04W 4/00* | (2009.01) |
| *H04W 4/14* | (2009.01) |
| *H04L 12/58* | (2006.01) |
| *H04W 4/12* | (2009.01) |
| *H04L 29/12* | (2006.01) |

(52) U.S. Cl.
CPC ............... *H04W 4/14* (2013.01); *H04L 51/00* (2013.01); *H04L 51/14* (2013.01); *H04L 51/38* (2013.01); *H04L 61/2596* (2013.01); *H04W 4/12* (2013.01); *H04L 61/2038* (2013.01)

(58) Field of Classification Search
None
See application file for complete search history.

(56) References Cited

U.S. PATENT DOCUMENTS

| 8,478,311 B2 | 7/2013 | Sennett et al. |
|---|---|---|
| 2009/0227276 A1* | 9/2009 | Agarwal et al. .............. 455/466 |
| 2015/0131519 A1* | 5/2015 | Kanabar et al. .............. 370/315 |
| 2015/0230090 A1* | 8/2015 | Barkan ............... H04L 63/0876 455/411 |

* cited by examiner

*Primary Examiner* — Justin Lee (74) *Attorney, Agent, or Firm* — Moser Taboada; Joseph Pagnotta (57) ABSTRACT

Methods and apparatus for routing off-net Short Message Service (SMS) messages between a first service provider network and a terminating service provider network are provided herein. In some embodiments, the method includes receiving a first SMS message including a first identifier associated with a first subscriber of the first service provider network stored in a source address field directed to a second identifier, determining that the second identifier is associated with a second subscriber of the terminating service provider network, associating the first identifier with a local reply identifier in a mapping database, replacing the first identifier in the source address field with the local reply identifier, and routing the first SMS message including the local reply identifier stored in the source address field to the second identifier.

15 Claims, 7 Drawing Sheets

METHOD AND SYSTEM FOR OFF-NET MESSAGE COMMUNICATIONS

CROSS-REFERENCE TO RELATED APPLICATIONS

This application claims benefit of U.S. provisional patent application Ser. No. 61/915,489, filed Dec. 12, 2013, which is herein incorporated by reference.

BACKGROUND

1. Field

The invention is related to systems and methods for terminating communications to a telephony device. More specifically, the invention relates to systems and methods for routing Short Message Service (SMS) and multimedia messaging service (MMS) communication between mobile devices on different mobile service provider networks.

2. Description of the Related Art

Mobile telephony devices, such as cellular telephones and mobile computing devices with Short Message Service (SMS) and multimedia messaging service (MMS) communication capabilities are typically provided with service from a mobile service provider.

When a first user makes a call, or sends an SMS or MMS directed to a second user using the same mobile service provider, it may be referred to as an "on-net" communication. In this case, the SMS/MMS or call is handled entirely over a single service provider's network, for example, via a Voice over Internet Protocol (VoIP) service provider network. Thus, the VoIP provider does not typically pay termination costs normally associated with connecting a call, or sending an SMS/MMS, to a recipient. In addition, replies from the second user in response to an SMS/MMS message, for example, are appropriately handled.

Other times, a first user may make a call, or send an SMS/MMS, directed to a phone number of a second user that is registered on a different service provider network. This may be referred to as an "off-net" communication. For example, a VoIP subscriber of a VoIP service provider may make a call, or send an SMS/MMS, directed to a second user using traditional mobile phone mobile communication technology standards, or publicly switched telephone network (PSTN) standards, provided by a different service provider. In this case, the outgoing leg of the call is still transmitted as voice packet data over an IP network. However, the terminating leg of the SMS/MMS/Call to the second user device is established using traditional mobile phone mobile communication technology standards or using other IP communication based service providers (e.g., WHATSAPP, VIBER, TANGO, etc.). In some cases, the VoIP service provider must pay a termination cost for use of traditional mobile communication service provider networks. This cost is either passed down to the subscriber (generally, the originating caller) or is absorbed by the VoIP service provider. In addition, replies from the second user in response to an off-net SMS message received including the first user's contact identifier in the source address field, for example, may not be properly handled.

Accordingly, the inventors have provided improved systems and methods for sending and receiving off-net SMS/MMS communications between mobile devices on different mobile service provider networks.

SUMMARY

Methods and system for routing off-net Short Message Service (SMS) messages between a first service provider network and a terminating service provider network are provided herein. In some embodiments, the method includes receiving a first SMS message including a first identifier associated with a first subscriber of the first service provider network stored in a source address field directed to a second identifier, determining that the second identifier is associated with a second subscriber of the terminating service provider network, associating the first identifier with a local reply identifier in a mapping database, replacing the first identifier in the source address field with the local reply identifier, and routing the first SMS message including the local reply identifier stored in the source address field to the second identifier.

In some embodiments, a method for routing off-net messages between a first service provider network and a terminating service provider network may include sending a first message including associated with a first subscriber of the first service provider network directed to a second identifier, receiving a second message in response to the first message including a local reply identifier stored in a destination address field of the second message, retrieving a first identifier associated with the first subscriber from a mapping database using the local reply identifier as a lookup key, replacing the local reply identifier in the destination address field with the first identifier, and routing the message to the first identifier.

In some embodiments, a system for routing off-net messages between a first service provider network and a terminating service provider network may include a service provider information database, a mapping database, a Short Message Peer to Peer (SMPP) gateway configured to receive a first message including a first identifier associated with a first subscriber of the first service provider network stored in a source address field directed to a second identifier, and an SMS processing module configured to: determine that the second identifier is associated with a second subscriber of the terminating service provider network using the second identifier as a lookup key in the service provider information database; associate the first identifier with a local reply identifier in a mapping database; and replace the first identifier in the source address field with the local reply identifier.

Other and further embodiments of the present invention are described below.

BRIEF DESCRIPTION OF THE FIGURES

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Exemplary embodiments consistent with the present invention described herein advantageously provide solutions for sending and receiving SMS/MMS communications between subscribers located on different mobile service provider networks (i.e., "off-net" communications). For example, in the embodiments provided below, subscriber A of a first service provider (e.g., a VoIP service provider) sends an SMS/MMS to subscriber B of a second service provider (e.g., a PSTN service provider) that may be located in a different country/region. Subscriber A is provisioned with a contact identifier by the first service provider and subscriber B is provisioned with a contact identifier by the second service provider. In order to route the SMS/MMS message from subscriber A to subscriber B, and replies to that SMS/MMS message from subscriber B to subscriber A, the first service provider may partner with a "peering partner" located in the country/region where subscriber B is located. In some embodiments, the peering partner may be another communication service provider network located in a different region/country. The peering partner network may be used to provide off-net SMS/MMS messages received from the first service provider to its own subscribers, or to subscribers of other service providers located in the same region/country as the peering partner. To facilitate the off-net messaging services, the peering partner may provide a pool of local contact identifiers (e.g., direct inward dialing (DID) numbers, IP addresses, etc.) that may be logically mapped to contact identifiers of subscribers of the first service provider. The logical mapping may be maintained either at the first service provider network or in the peering partner's network, to facilitate sending SMS/MMS messages and handling replies to those SMS/MMS messages. In some embodiments, the logical mapping described above may be temporarily assigned from a pool of numbers that can be reallocated and reused for different subscribers as is discussed below in further detail.

In the following description, references are made to a user's or a customer's telephony device. This term encompasses traditional cellular telephones, as well as mobile telephony devices that include additional functionality, such as the ability to wirelessly communicate digital data. These terms also encompass mobile computing devices that include SMS/MMS communication capabilities provided by either or both of a cellular transceiver and a wireless digital data transceiver. The following description also refers to terminating a telephony communication. This phrase refers to delivering text messages and other forms of text-based, multi-media based, audio-based, or video-based messaging to a telephony device. This phrase also encompasses other forms of communications that may be carried over a telephony network.

The following description provides examples of how embodiments of the present invention can be used to route off-net SMS/MMS communications between subscribers of two or more different mobile service providers. Any description below pertaining to SMS messages, equally applies to MMS message. The SMS/MMS messages may be originated on any type of computing device that may include cellular telephones, smart phones, laptop or personal computing devices running application software that provides for telephony communications (e.g., TVs, etc.).

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

Figure 1:
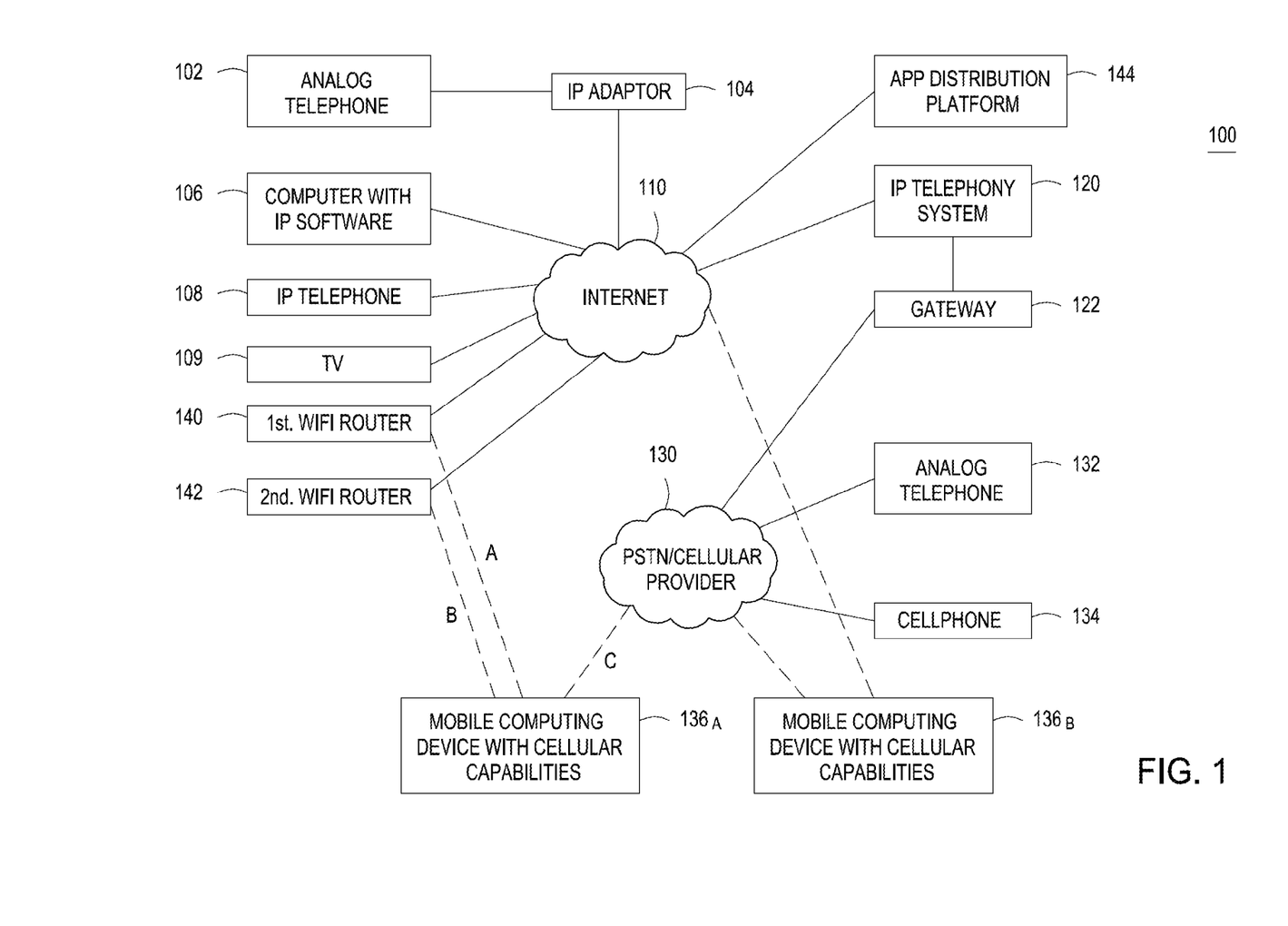
FIG. 1 depicts a block diagram of a telecommunication network, according to one or more embodiments of the invention.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 or a television 109 to place and receive IP based telephone calls, and to access other IP telephony systems (not shown). The computer 106 may be a personal computer (PC), a tablet device, a gaming system, and the like. In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities 136A (e.g., a smartphone) is capable of establishing a first wireless data connection A with a first wireless access point 140, such as a WiFi or WiMax router. The first wireless access point 140 is coupled to the Internet 110. Thus, the mobile computing device 136A can establish a VOIP telephone call with the IP telephony system 120 via a path through the Internet 110 and the first wireless access point 140.

FIG. 1 also illustrates that the mobile computing device 136A can establish a second wireless data connection B with a second wireless access point 142 that is also coupled to the Internet 110. Further, the mobile computing device 136A can establish either a third wireless data connection C via a packet-switch network provided by a cellular service provider 130 using its cellular telephone capabilities, or establish a voice based session telephone call via a circuit-switched network provided by a cellular service provider 130. The mobile computing device 136A could also establish a VoIP telephone call with the IP telephony system 120 via the second wireless connection B or the third wireless connection C.

Although not illustrated in FIG. 1, the mobile computing device 136A may be capable of establishing a wireless data connection to a data network, such as the Internet 110, via alternate means. For example, the mobile computing device 136A might link to some other type of wireless interface using an alternate communication protocol, such as the WIMAX standard. In the embodiments described above, a device may act as a mobile telephony device once it is configured with appropriate application software that may be downloaded from an app distribution platform 144. For example, mobile computing device 136A may download a VOIP mobile app from app distribution platform 144 and install the VOIP mobile app on mobile computing device 136A.

Similarly, mobile computing device with cellular capabilities 136B may also be coupled to internet 110 and/or cellular service provider 130. In some embodiments, mobile computing device 136B may be connected to internet 110 via a WIFI or WIMAX connection, and the like, and can also establish a VOIP telephone calls with the IP telephony system 120 similar to mobile computing device 136A. In embodiments of the present invention, communications environment 100 may be used to establish voice based or data based telecommunications sessions between mobile computing device 136A and mobile computing device 136B, depending on various criteria associated with each of the mobile computing devices, as will be described below in more detail. In some exemplary embodiments described below, mobile computing devices 136A and 136B are on different service provider networks and communications between mobile computing devices 136A and 136B are off-net communications.

Figure 2A:
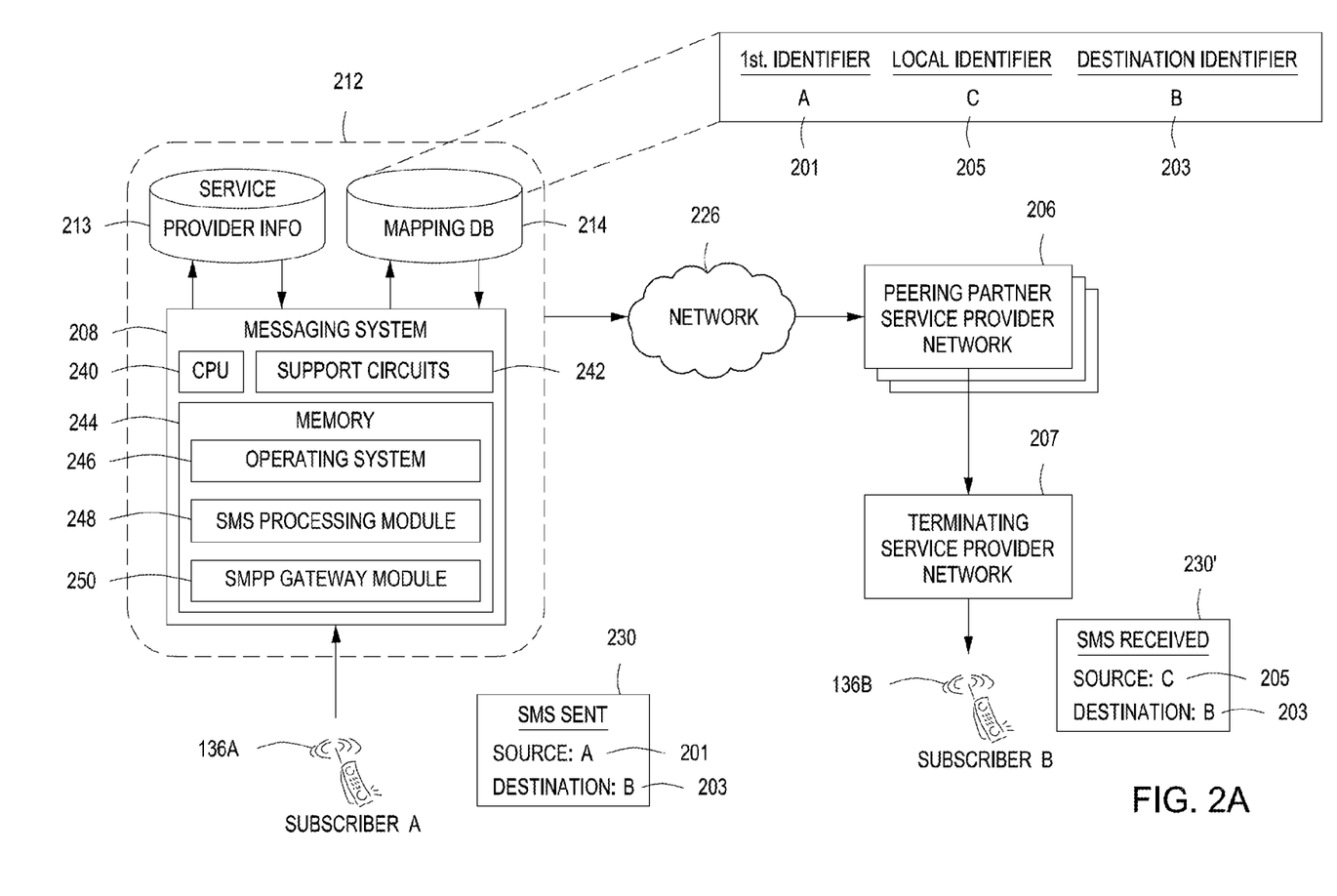
FIGS. 2A and 2B are system level representations of elements that may be involved in routing off-net SMS messages according to some embodiments of the present invention.

FIG. 2A depicts a system 200 including various elements that may be involved in routing off-net SMS communications in at least one embodiment consistent with the present invention where a mapping database 214 and associated logical mapping functions are maintained by the first service provider 212. As shown in FIG. 2, subscriber A is associated with a first communication identifier 201 provisioned by the first service provider 212. Subscriber A originates and sends an SMS message 230 via mobile computing device 136A directed to subscriber B associated with a second communication identifier 203 located on a different service provider network (e.g., terminating service provider network 207). In some embodiments, the first and second communication identifiers may be phone numbers, direct inward dial (DID) numbers, Internet Protocol (IP) addresses, email addresses, and the like. In some embodiments, internal identifiers that are specific to two partnering service providers (i.e., first service provider 212 and peering partner 206) are used as the first and second communication identifiers. The first service provider 212 and the terminating service provider network 207 may be an IP telephony system provider 120 or PSTN/cellular provider 130 as described above.

In some embodiments, subscriber A may send the SMS message using a native communication app or over the top (OTT) communication app installed on mobile computing device 136A or any other type of compatible device described with respect to FIG. 1 (e.g., computer with software 106, IP telephone 108, TV 109, and the like.). In other embodiments, subscriber A may send the SMS message via a Web service accessed by mobile computing device 136A. The SMS message 230 sent by subscriber A may include subscriber A's communication identifier 201 in one or more source address fields, and subscriber B's communication identifier 203 in one or more destination address fields within a header or body of the SMS message as defined by the Short Message Peer to Peer (SMPP) protocol. The SMS message may also include other standard SMS fields defined by the SMPP protocol. The SMPP protocol standardizes an SMS communication interface for the communication of messages between a message center and an SMS application system. For a detailed description of the SMPP protocol, see SMPP Developers Forum, Short Message Peer to Peer Protocol Specification v3.4 (Oct. 12, 1999), incorporated herein by reference.

When subscriber A sends an SMS/MMS communication from device 136A, the message is processed by messaging system 208 located on first service provider network 212. In some embodiments, messaging system 208 may be a short message service center (SMSC) that stores, forwards, converts, modifies and delivers SMS messages. In some embodiments, the messaging system 208 comprises a Central Processing Unit (CPU) 240, support circuits 242 and a memory 244. The CPU 240 may comprise one or more commercially available microprocessors or microcontrollers that facilitate data processing and storage. The various support circuits 242 facilitate the operation of the CPU 240 and include one or more clock circuits, power supplies, cache, input/output circuits, and the like. The memory 244 comprises at least one of Read Only Memory (ROM), Random Access Memory (RAM), disk drive storage, optical storage, removable storage and/or the like. In some embodiments, the memory 244 comprises (or may otherwise be associated or communicatively couple with) an operating system 246, an SMS processing module 248 and a Short Message Peer-to-Peer (SMPP) gateway module 250. Although the messaging system 208 is schematically shown as a single device, those skilled in the art will appreciate that each module (e.g., SMS processing module 248, SMPP gateway module 250, etc.) may be handled by a separate server/system communicatively coupled to provide the messaging functionality described herein. In some embodiments, the messaging system 208 is communicatively coupled to a service provider information database 213 and a mapping database 214. Although service provider information database 213 and mapping database 214 are shown as separate elements, in some embodiments, these databases may be disposed in memory 244 of the messaging system 208. In addition, in some embodiments, service provider information database 213 and/or mapping database 214 may be external databases maintained by a third-party and provided access to first service provider network 212 by agreement.

The operating system (OS) 246 generally manages various computer resources (e.g., network resources, file processors, and/or the like). The operating system 246 is configured to execute operations on one or more hardware and/or software modules, such as Network Interface Cards (NICs), hard disks, virtualization layers, firewalls and/or the like. Examples of the operating system 246 may include, but are not limited to, LINUX, MAC OSX, BSD, UNIX, MICROSOFT WINDOWS, proprietary OSs, and the like.

The SMS message 230 may be sent to the messaging system 208 on the first service provider network 212 using an HTTP or SMPP protocol over an IP network (such as, for example, internet 110) or over a PSTN provider network 130. Other non-limiting examples of SMS protocols that may be used may include UCP/EMI, CIMD2, and GSM/3G. Non-limiting examples of MMS protocols that may be used include MM7, MM4, MM3, MM1 and EAIF.

When the messaging system 208 receives SMS message 230 from user device 136A, the messaging system 208 analyzes/processes the SMS message 230 to determine where the SMS message is to be sent, and modify the SMS message accordingly. In some embodiments, the SMS processing module 248 may first extract a communication identifier stored in the destination address field of an SMS message to determine information related to the terminating service provider network 207. For example, in some embodiments, SMS processing module 248 will extract subscriber B's communication identifier 203 from the SMS message 230 and perform a lookup using communication identifier 203 in service provider information database 213 to determine the identity of the terminating service provider network 207, the location of the terminating service provider network 207, costs associated with delivering SMS messages to the terminating service provider network 207, and the like. In some embodiments, the lookup is performed a using telephone number mapping (e.g., E.164 Number Mapping (ENUM) mapping, and the like) lookup in service provider information database 213. In some embodiments, information derived from communication identifier 203 (e.g., using a hash function or other type of algorithm) may be used to perform a lookup in service provider information database 213.

After information regarding the terminating service provider network 207 is obtained, the SMS processing module 248 will determine whether the terminating carrier is a peering partner (e.g., peering partners 206) of the first service provider network 212. A peering partner 206 may be another communication service provider network located in a different region/country that, by agreement with the first service provider network 212, can recognize and route messages directly to its subscribers, and recognize and route replies from its subscribers directly back to the first service provider network without have to alter the communication identifiers in the SMS message.

Figure 2B:
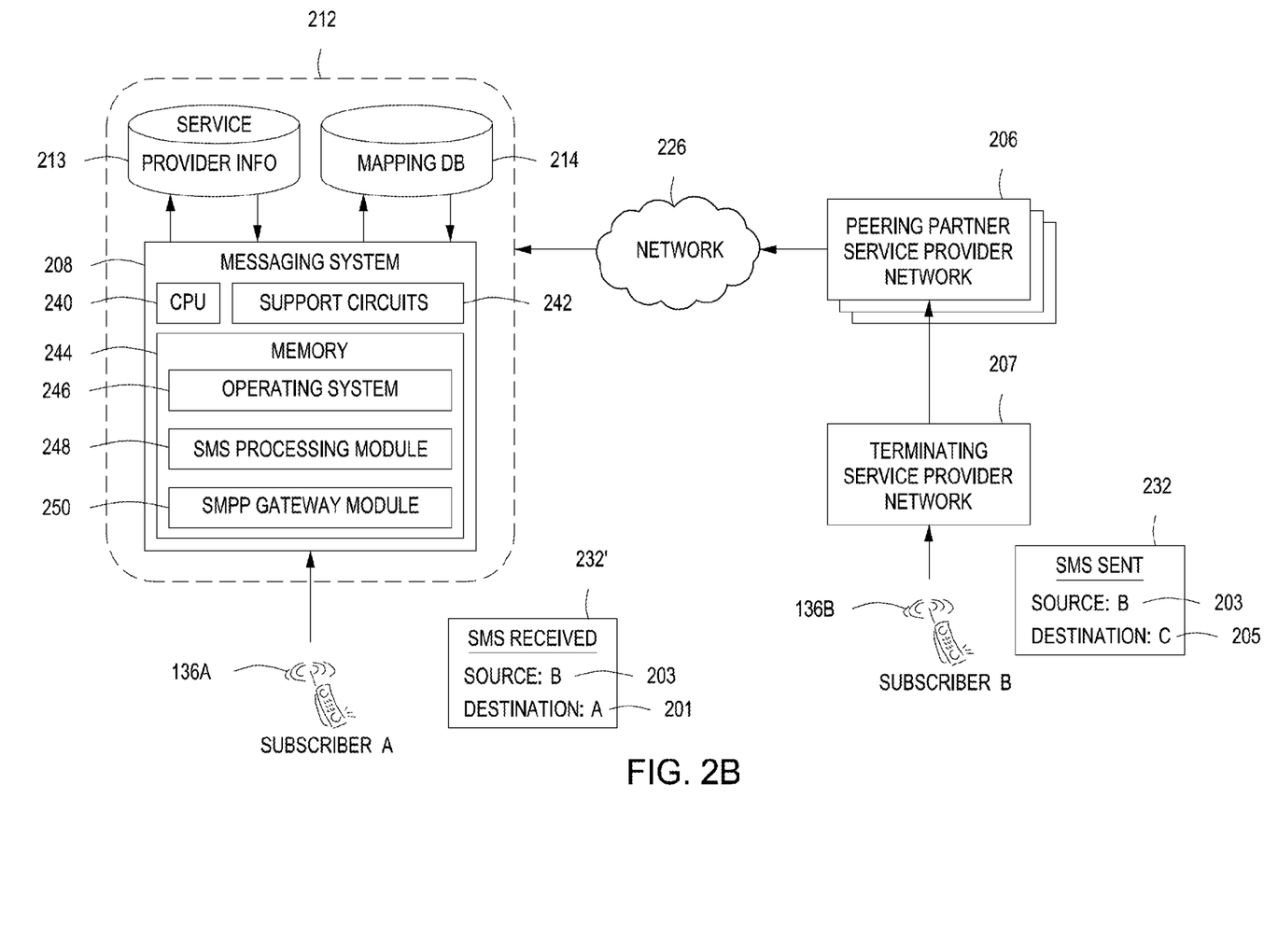

If the terminating service provider network 207 is not a peering partner, than a mapping between subscriber A's communication identifier 201, and a local reply identifier, may need to be performed. Specifically, in the embodiments consistent with FIG. 2, the peering partner 206 shares, or otherwise makes available, a pool of local communication numbers (e.g., DID numbers), with the first service provider 212. The pool of local numbers may be specific to a country or region in which the peering partner 206 and/or terminating service provider 207 provides communication service. The pool of local numbers may be stored in mapping DB 214. SMS processing module 248 will map subscriber A's communication identifier 201 with a local reply identifier 205 and store that association in mapping DB 214. In some embodiments, the destination identifier 203 will be stored in association with both subscriber A's communication identifier 201 and the local reply identifier 205 in order to properly treat reply messages as described below in further detail. SMS processing module 248 will replace subscriber A's communication identifier 201 stored in the source destination field of SMS 230 with the local reply identifier 205. SMPP Gateway module 250 will then forward the SMS message 230' over network 226 to peering partner 206 to be forwarded to terminating service provider network 207, and ultimately to an account associated with subscriber B. It is generally understood in the art that forwarding and/or routing of an SMS message, for example, may include generating and sending a new SMS message based on the information included in the received SMS message and not literally forwarding/routing the exact message received. Subscriber B may retrieve SMS message 230' via mobile computing device 136B. The mapping between subscriber A's communication identifier 201, the local reply identifier 205, and subscriber B's communication identifier 203 may be a temporary mapping for a configured period of time (i.e., an expiration period). For example, in some embodiments the association between subscriber A's communication identifier 201, the local reply identifier 205, and subscriber B's communication identifier 203 may be stored for one or more hours or for one or more days (e.g., for a predetermined period of time after associating the source communication identifier 201 with the local reply identifier 205). In some embodiments, the association between subscriber A's communication identifier 201, the local reply identifier 205, and subscriber B's communication identifier 203 may be stored for a configurable time period after the last SMS message in the conversation is sent/received. After the expiration period, the local reply identifier 205 may be used for another subscriber as necessary.

For example, when a subscriber A with mobile computing device 136A sends a message directed to subscriber B located in India, the first service provider 212 selects a local communication identifier C 205 from pool of India numbers in Mapping DB 214 provided by peering partner 206. The first service provider 212 sends the SMS message 230', including local reply identifier C 205 in the source address field, via the SMPP gateway module 250 to the peering partner. The peering partner sends an outgoing SMS message 230' directed to subscriber B's communication identifier 203 and including local reply identifier C 205 in the "FROM" or source address field.

In some embodiments, the first service provider 212 may have a plurality of peering partners. The choice of peering partner 206 used as the intermediary service provider may be based on cost (i.e., which partner 206 provides the lowest use/forwarding/delivery costs).

FIG. 2B depicts system 200 when subscriber B responds to the SMS message 230' received (as described above with respect to FIG. 2A) via mobile computing device 136B. The terminating service provider 207 receives the reply SMS 232 from subscriber B via mobile computing device 136B. The reply SMS message 232 sent by subscriber B may include subscriber B's communication identifier 203 in one or more source address fields, and subscriber A's local reply identifier 205 in one or more destination address fields within a header or body of the reply SMS message 232. The terminating service provider 207 will recognize the local reply identifier 205 as a valid local number and forward the reply SMS message 232 to peering partner 206. Peering partner 206 will recognize the local reply identifier 205 as one of the pool of numbers provided to the first service provider 212 and forward the reply SMS message 232 to first service provider 212 accordingly. When the messaging system 208 receives SMS message 232 from the peering partner 206 via SMPP gateway module 250, the SMS processing module 248 will analyze/process the reply SMS message 232 to determine where the SMS message is to be sent, and modify the SMS message accordingly. The SMS processing module 248 will perform a reverse lookup on the local reply identifier 205 of the inbound reply SMS message 232 stored in a destination address field in mapping DB 114 to get the originating communication identifier 201 of subscriber A. The SMS processing module 248 will then replace local reply identifier 205 stored in a destination address field in reply SMS message 232 with communication identifier 201 of subscriber A. The messaging system 208 will then route the modified reply SMS message 232' to communication identifier 201 of subscriber A.

In some embodiments, if subscriber B responds to an SMS message after the expiration period has expired and the association between the originating communication identifier 201 and the local reply identifier 205 no longer exists, a failure delivery receipt is sent back to subscriber B stating that the mapping has expired. As described above, in some embodiments, the destination communication identifier 203 will be stored in association with both source communication identifier 201 and the local reply identifier 205 in order to properly treat reply messages. For example, after the expiration period has expired and the association between the source communication identifier 201 and the local reply identifier 205 no longer exists, local reply identifier 205 may be assigned to a different communication identifier (e.g., local reply identifier 205 mapped to subscriber X's communication identifier sending an SMS message to subscriber Y's communication identifier). If, for example, subscriber B replies to an SMS message directed to the local reply identifier 205 after the local reply identifier 205 has been reassigned to another source communication identifier, the system will recognize that subscriber B's identifier is different from currently stored destination communication identifier associated with the local reply identifier 205 and generate the appropriate failure delivery receipt.

Figure 3:
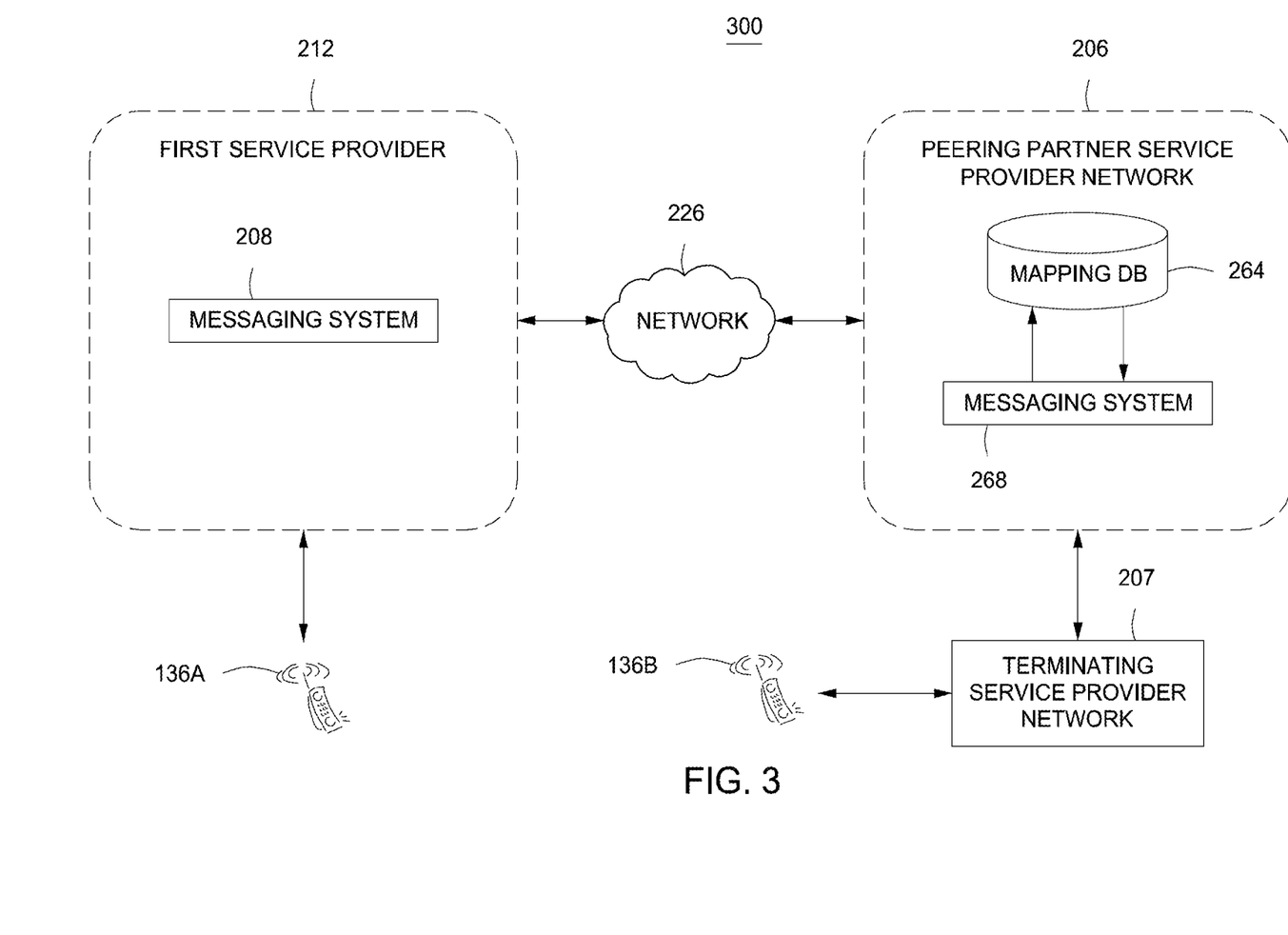
FIG. 3 is another system level representation of elements that may be involved in routing off-net SMS messages according to some embodiments of the present invention.

FIG. 3 depicts a system 300 including various elements that may be involved in routing off-net SMS communications in at least one embodiment consistent with the present invention where a mapping database 264 and associated logical mapping functions are maintained by the peering partner 206. The logical mapping functions may be performed by messaging system 268 on peering partner network 206. Messaging system 268 may include similar elements and mapping features as described above with respect to messaging system 208 disposed on the first service provider network 212. In some embodiments consistent with FIG. 3 where the peering partner network 206 is maintaining a mapping database performing mapping functions, the messaging system 208 disposed on the first service provider network 212 may or may not include its own mapping database. For example, in some embodiments, the first service provider 212 may maintain a mapping database for certain countries/regions, while in other countries/regions peering partners of the first service provider 212 will maintain the mapping database and mapping functionality.

Figure 4A:
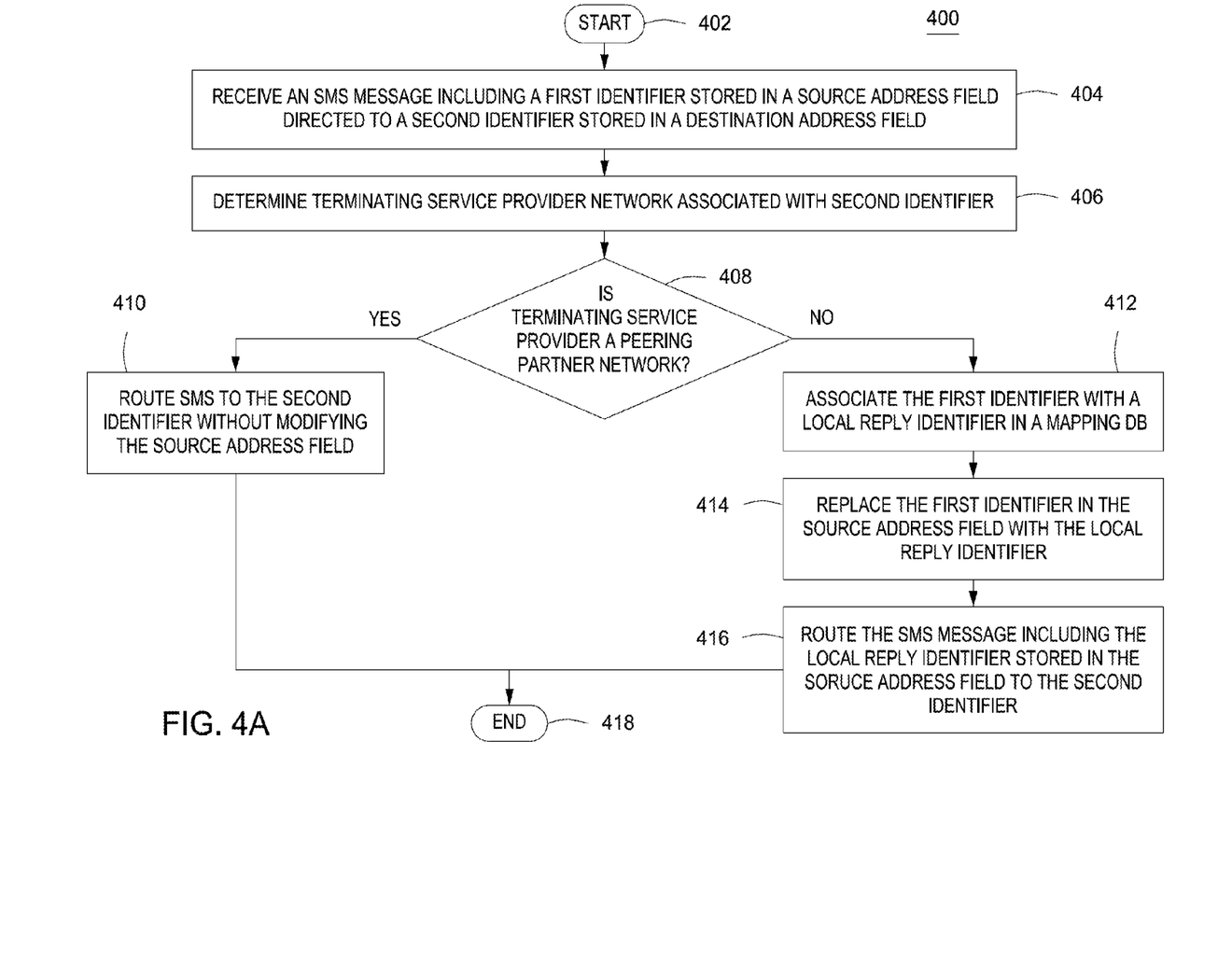
FIGS. 4A and 4B are flow charts of methods for routing off-net SMS messages between a first service provider network and a terminating service provider network according to some embodiments of the present invention.

FIG. 4A is a flow chart of a method 400 for routing off-net Short Message Service (SMS) messages between a first service provider network and a terminating service provider network. In some embodiments, the method 400 may be performed by messaging system 208, message system 268, or a combination of messaging system 208 and message system 268. The method 400 begins at 402 and proceeds to 404 where an SMS message 230 is received. The SMS message 230 received is from a first subscriber of a first service provider network 212 via a first device 136A, and is directed to a second subscriber associated with a terminating service provider network 207 located in a different country/region. The SMS message 230 received at 404 includes a first communication identifier 201, associated with the first subscriber, stored in a source address field and a second communication identifier 203, associated with the second subscriber, stored in a destination address field. At 406, the identity of the terminating service provider network 207 associated with the second communication identifier 203 is determined. In some embodiments, this may be accomplished by performing a lookup in a carrier information database (e.g., service provider information database 213) using the second communication identifier 203 as a lookup key.

If, at 408, it is determined that the terminating service provider network 207 is a peering partner network 206, the method 400 proceeds to 410 where the SMS message 230 is routed to the second communication identifier 203 without modifying the source address field of the SMS message 230. That is, the SMS message 230 will be forwarded to a peering partner 206 that can facilitate delivery of the SMS message 230 to the second subscriber associated with the second communication identifier 203, and can also facilitate delivery of replies to that SMS message back to the first service provider network 212 without having to perform any mapping functions.

If, at 408, it is determined that the terminating service provider network 207 is not a peering partner network 206, then the method 400 proceeds to 412. At 412, the first communication identifier 201 is associated with a local reply identifier 205 in a mapping database (e.g., mapping database 214 or 264). As discussed above with respect to FIGS. 2A-3, a local reply identifier 205 is one of the pool of communication identifiers provided by a peering partner 206 within the country/region that the terminating service provider network 207 operates in. One of the pool of local reply identifiers provided by the peering partner is selected to be associated with the first communication identifier 201. In some embodiments, the local reply identifier will be randomly selected from the pool of identifiers available. In other embodiments, an algorithm/hash function will be used to select the local reply identifier that provides a 1 to 1 mapping between the originating communication identifier 201 and the local reply identifier 205. In some embodiments, the second communication identifier 203 may be stored in association with both the first communication identifier 201 and the local reply identifier 205 in the mapping database 214/264.

At 414, the first communication identifier 201 that is stored in the source address field of the SMS message 230 is replaced with the local reply identifier 205. At 416, the modified SMS message 230' including the local reply identifier 205 stored in the source address field is routed to the second communication identifier 203 stored in the destination field of the SMS message 230'. As used herein, routing the modified SMS message 230' may include generating and sending a new SMS message including the local reply identifier 205 stored in the source address field that is routed to the second communication identifier 203 stored in the destination field of the SMS message 230'. The second subscriber associated with the second communication identifier 203 may then access their account to retrieve the SMS message 230' via mobile computing device 136B, for example. The method ends at 418.

Figure 4B:
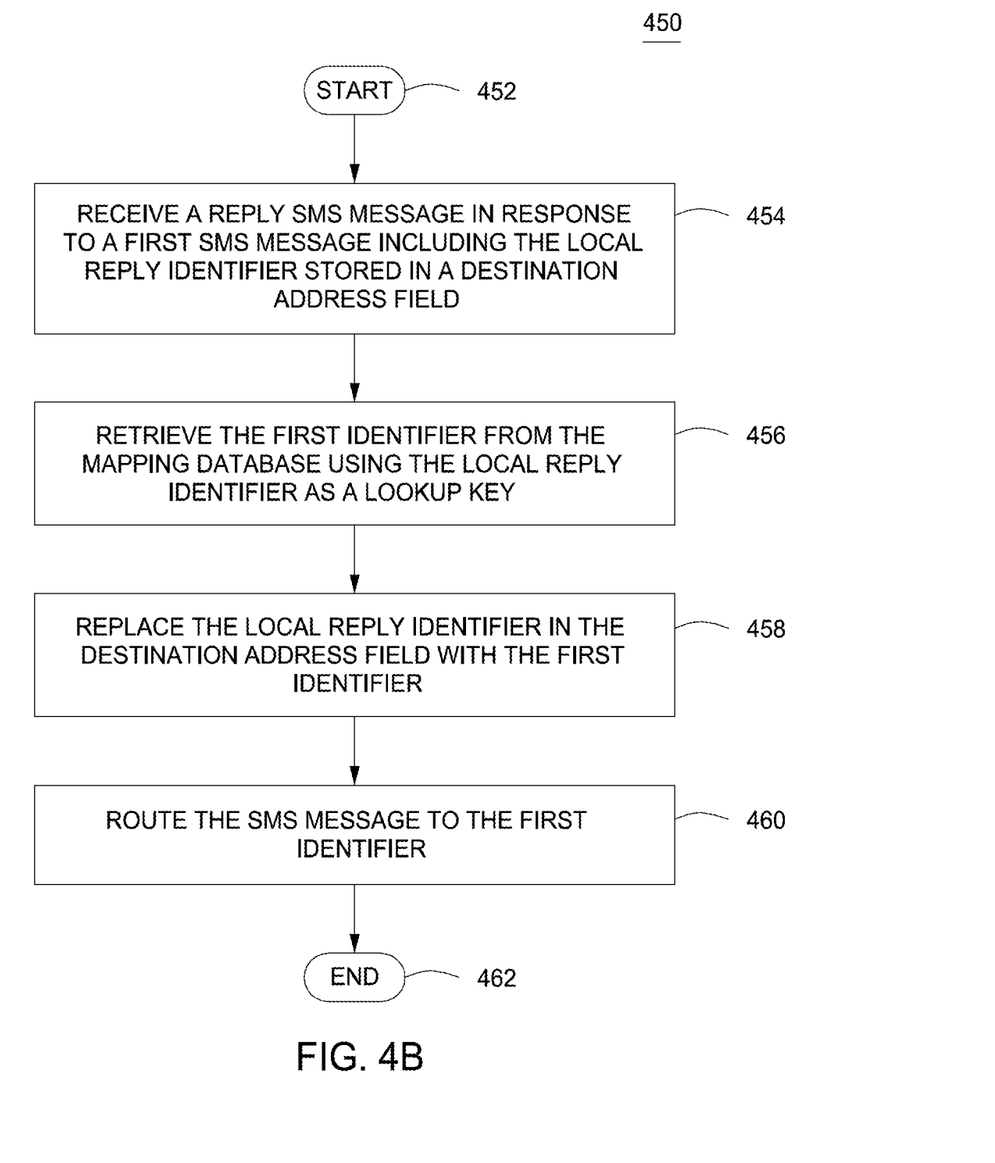

FIG. 4B is a flow chart of a method 450 for routing replies to off-net Short Message Service (SMS) messages sent between a first service provider network 212 and a terminating service provider network 207. The method 450 begins at 452, and proceeds to 454. At 454, a reply SMS message 232 in response to SMS message 230' is received. The SMS message 232 received at 454 may include the second subscriber's communication identifier 203 in one or more source address fields, and the first subscriber's local reply identifier 205 in one or more destination address fields within a header or body of the reply SMS message 232.

When the messaging system 208/268 receives the reply SMS message 232, the first communication identifier 201 will be retrieved from the mapping database 2014/264 using the local reply identifier 205 as a lookup key at 456. At 458, the local reply identifier 205 that is stored in the destination address field of the reply SMS message 232 will be replaced with the first communication identifier 201. The modified reply SMS message 232' will then be routed to the first communication identifier stored in the destination address field at 460. The method ends at 462.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 5:
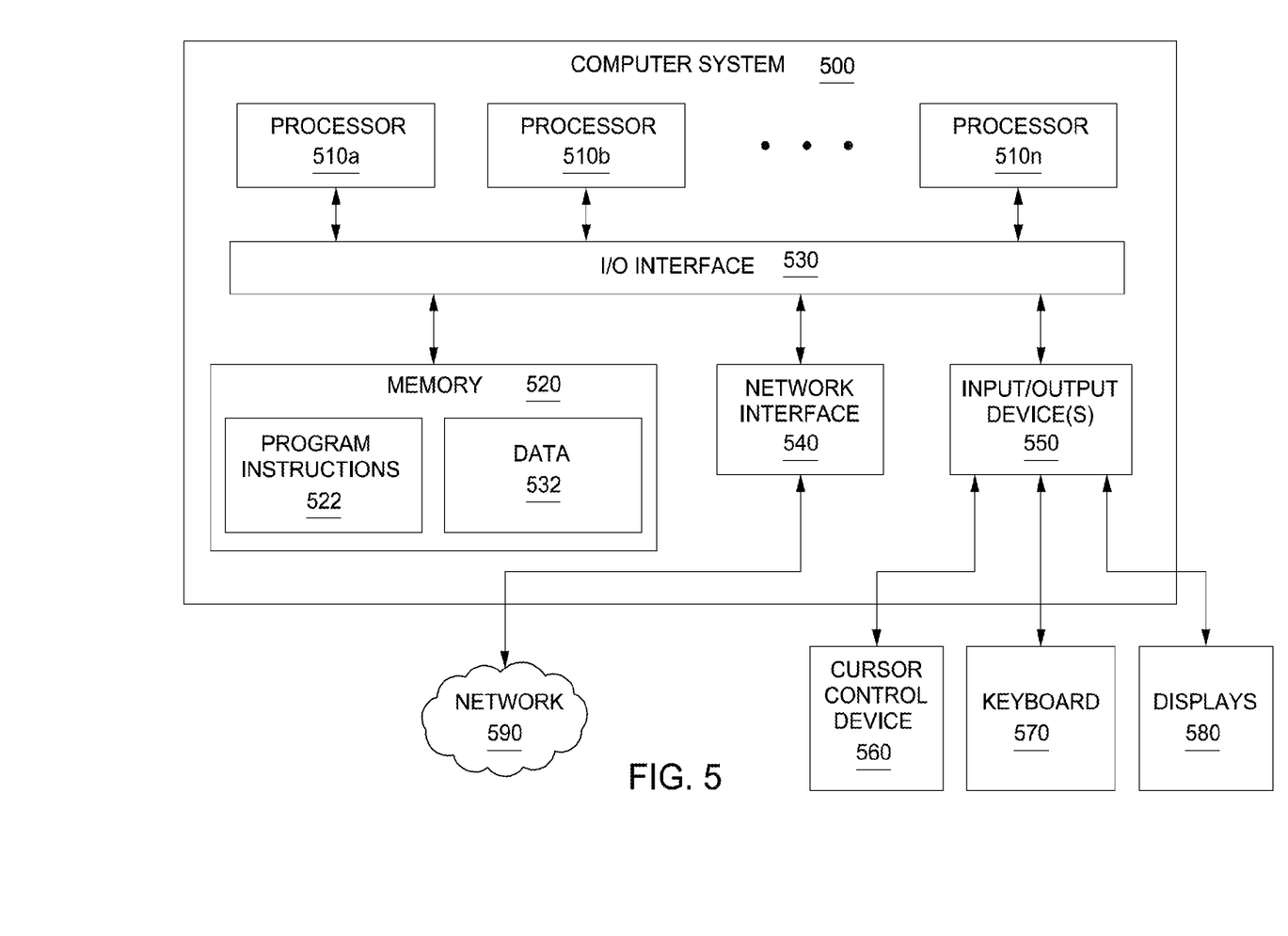
FIG. 5 depicts a computer system that can be utilized in various embodiments of the present invention, according to one or more embodiments.

FIG. 5 depicts a computer system 500 that can be utilized in various embodiments of the present invention to implement the computer and/or the display, according to one or more embodiments.

Various embodiments of method and apparatus for transitioning between a plurality of pages on a display device, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement methods 400 and 450 as processor-executable executable program instructions 522 (e.g., program instructions executable by processor(s) 510) in various embodiments.

In the illustrated embodiment, computer system 500 includes one or more processors 510a-510n coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIGS. 4A and 4B. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for routing off-net messages between a first service provider network and a terminating service provider network, the method comprising:
   receiving a first message directed to a second identifier, the first message including a first identifier associated with a first subscriber of the first service provider network stored in a source address field and wherein the first message is one of a Short Message Service (SMS) or multimedia messaging service (MMS) message;
   determining that the second identifier is associated with a second subscriber of the terminating service provider network;
   associating the first identifier with a local reply identifier, local to the terminating service provider network, by storing an association between the first identifier and the local reply identifier in a mapping database, wherein the association is stored for a predetermined period of time after associating the first identifier with the local reply identifier in the mapping database;

replacing the first identifier in the source address field with the local reply identifier to avoid message termination costs at the terminating service provider network; and routing the first message including the local reply identifier stored in the source address field to the second identifier.

2. The method of claim 1, wherein the local reply identifier is an identifier selected from a plurality of identifiers specific to a country or geographic region.

3. The method of claim 1, wherein the first identifier, second identifier and local reply identifier are direct inward dialing (DID) numbers.

4. The method of claim 1, wherein the determination that the second identifier is associated with the terminating service provider network is performed using E.164 Number (ENUM) lookup using the second identifier.

5. The method of claim 1, wherein the first service provider network is a Voice over Internet Protocol (VoIP) service provider network.

6. The method of claim 1, wherein the terminating service provider network is not a peering partner of the first service provider network.

7. The method of claim 1, wherein routing the first message includes sending the first message to an account associated with the second identifier.

8. The method of claim 1, further comprising:
receiving a reply message in response to the first message including the local reply identifier stored in a destination address field.

9. The method of claim 8, further comprising:
retrieving the first identifier from the mapping database based upon the local reply identifier;
replacing the local reply identifier in the destination address field with the first identifier; and
routing the message to the first identifier.

10. The method of claim 1, wherein the local reply identifier associated with the first identifier in the mapping database is selected from a plurality of local reply identifiers provided by one or more peering partner service provider networks.

11. The method of claim 10, wherein one or more peering partner service provider networks are located in a same country or geographic region as the terminating service provider network.

12. The method of claim 11, wherein routing the first message including the local reply identifier stored in the source address field to the second identifier includes forwarding the first message to one of the one or more peering partner service provider networks.

13. A system for routing off-net Short Message Service (SMS) messages between a first service provider network and a terminating service provider network the system comprising:
a service provider information database;
a mapping database;
a Short Message Peer to Peer (SMPP) gateway configured to receive a first message directed to a second identifier, the first message including a first identifier associated with a first subscriber of the first service provider network stored in a source address field and wherein the first message is one of a Short Message Service (SMS) or multimedia messaging service (MMS) message; and
an SMS processing module configured to:
determine that the second identifier is associated with a second subscriber of the terminating service provider network using the second identifier, or information derived from the second identifier, and the service provider information database;
associate the first identifier with a local reply identifier in the mapping database, the local reply identifier being local to the terminating service provider network;
store an association between the first identifier and the local reply identifier in a mapping database for a predetermined period of time after associating the first identifier with the local reply identifier;
replace the first identifier in the source address field with the local reply identifier to avoid message termination costs at the terminating service provider network; and
route the first message including the local reply identifier stored in the source address field to the second identifier.

14. A method for routing off-net messages between a first service provider network and a terminating service provider network, the method comprising:
receiving a first message directed to a second identifier, the first message including a first identifier associated with a first subscriber of the first service provider network stored in a source address field and wherein the first message is one of a Short Message Service (SMS) or multimedia messaging service (MMS) message;
determining that the second identifier is associated with a second subscriber of the terminating service provider network;
associating the first identifier with a local reply identifier, local to the terminating service provider network, by storing an association between the first identifier and the local reply identifier in a mapping database, wherein the association is stored for a predetermined period of time after a last message associated with the local reply identifier and the first identifier is sent or received;
replacing the first identifier in the source address field with the local reply identifier to avoid message termination costs at the terminating service provider network; and
routing the first message including the local reply identifier stored in the source address field to the second identifier.

15. A method for routing off-net messages between a first service provider network and a terminating service provider network to avoid message termination costs at the terminating service provider network, the method comprising:
receiving a first message directed to a second identifier, the first message including a first identifier associated with a first subscriber of the first service provider network stored in a source address field and wherein the first message is one of a Short Message Service (SMS) or multimedia messaging service (MMS) message;
determining that the second identifier is associated with a second subscriber of the terminating service provider network;
associating the first identifier with a local reply identifier, local to the terminating service provider network, wherein the local reply identifier is associated with the first identifier in a mapping database and wherein the local reply identifier is selected from a plurality of local reply identifiers provided by one or more peering partner service provider networks;

replacing the first identifier in the source address field with the local reply identifier;

routing the first message including the local reply identifier stored in the source address field to the second identifier;

determining a cost associated with forwarding the first message to each of the one or more peering partner service provider networks; and selecting one of the one or more peering partner service provider networks to forward the first message to, based on the cost associated with forwarding, in order to avoid message termination costs at the terminating service provider network, wherein one or more peering partner service provider networks are located in a same country or geographic region as the terminating service provider network.

* * * * *